Aug. 24, 1965   W. F. STRADER   3,202,013
APPARATUS FOR EXCLUSIVE ACTUATION OF SELECTED
ONES OF A PLURALITY OF MECHANISMS
Filed April 26, 1961   8 Sheets-Sheet 1

INVENTOR.
WALTER F. STRADER
BY
W. J. Grubb
ATTORNEY

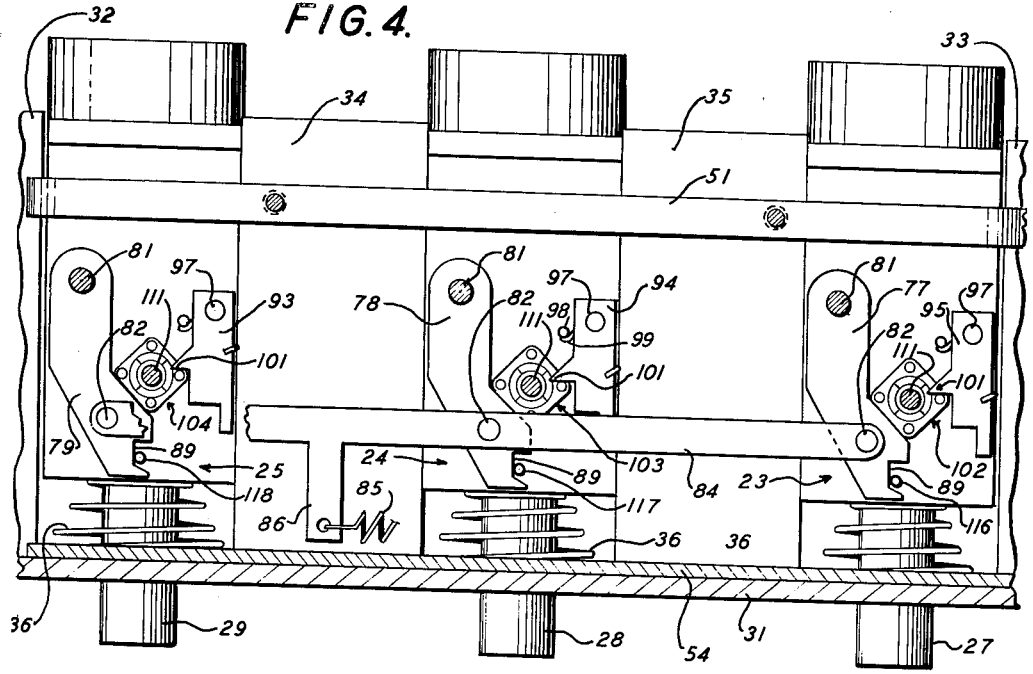
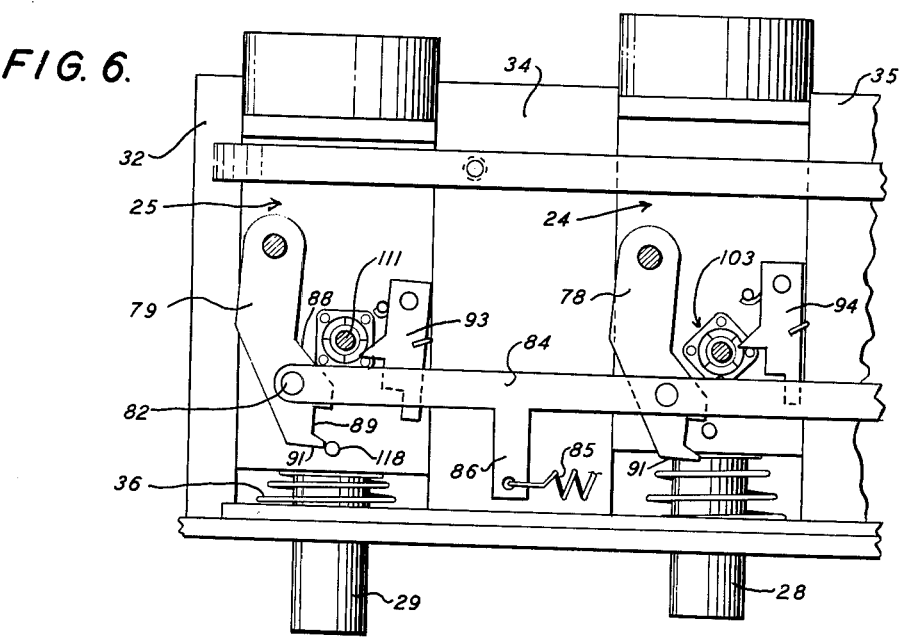
INVENTOR.
WALTER F. STRADER
BY
W. J. Gribble
ATTORNEY

Aug. 24, 1965    W. F. STRADER    3,202,013
APPARATUS FOR EXCLUSIVE ACTUATION OF SELECTED
ONES OF A PLURALITY OF MECHANISMS
Filed April 26, 1961    8 Sheets-Sheet 3

INVENTOR.
WALTER F. STRADER
BY
W. J. Gribble
ATTORNEY

Aug. 24, 1965    W. F. STRADER    3,202,013
APPARATUS FOR EXCLUSIVE ACTUATION OF SELECTED
ONES OF A PLURALITY OF MECHANISMS
Filed April 26, 1961    8 Sheets-Sheet 6

INVENTOR.
WALTER F. STRADER
BY
W. J. Gribble
ATTORNEY

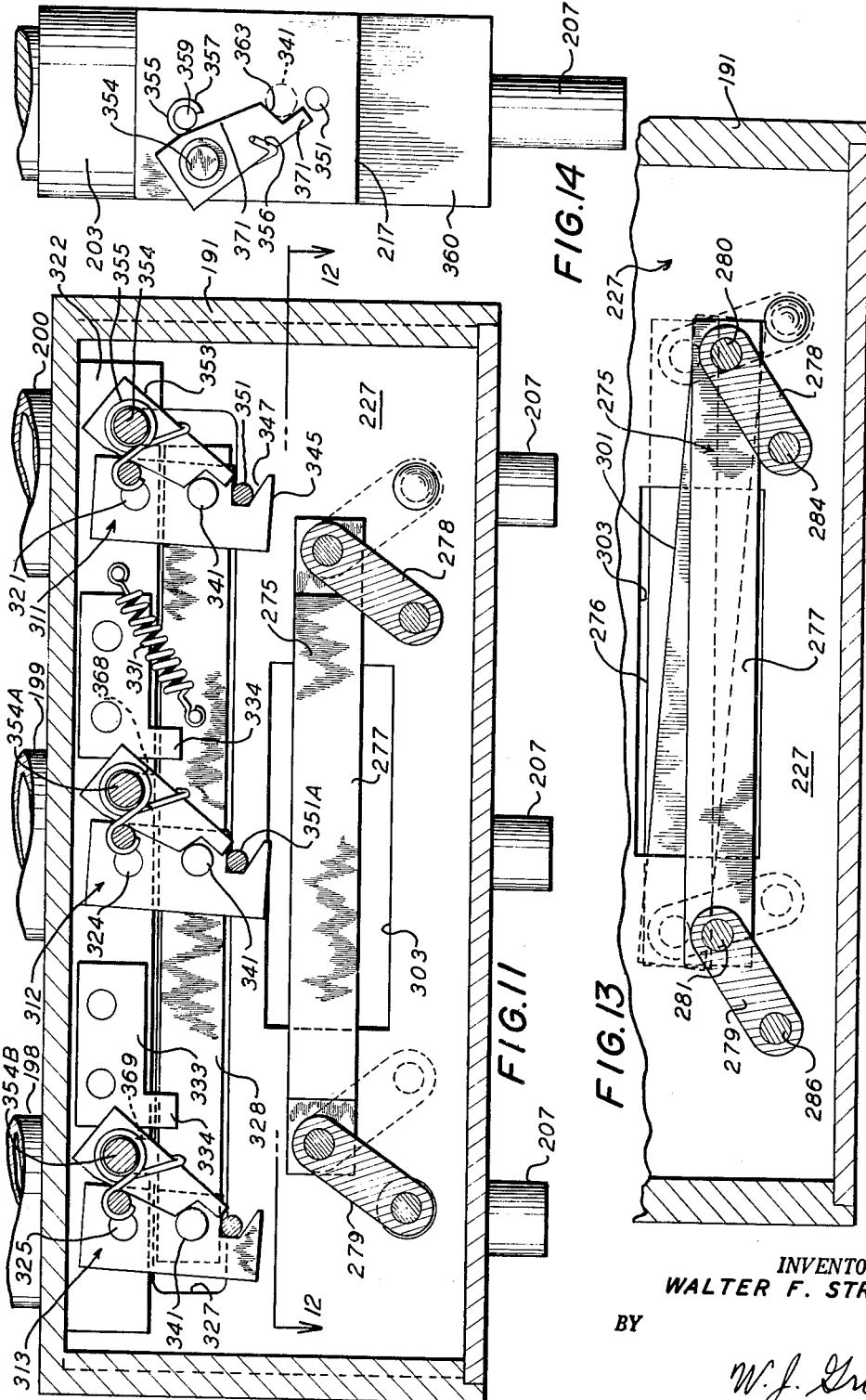

Aug. 24, 1965 W. F. STRADER 3,202,013
APPARATUS FOR EXCLUSIVE ACTUATION OF SELECTED
ONES OF A PLURALITY OF MECHANISMS
Filed April 26, 1961 8 Sheets-Sheet 8

INVENTOR.
WALTER F. STRADER

W. J. Gribble
ATTORNEY

United States Patent Office 3,202,013
Patented Aug. 24, 1965

3,202,013
APPARATUS FOR EXCLUSIVE ACTUATION OF SELECTED ONES OF A PLURALITY OF MECHANISMS
Walter F. Strader, Los Angeles, Calif., assignor to Punton Corporation, Culver City, Calif., a corporation of California
Filed Apr. 26, 1961, Ser. No. 105,829
4 Claims. (Cl. 74—483)

The invention relates to apparatus for actuating mechanisms and more particularly to apparatus for actuating one of a plurality of mechanisms to the exclusion of the others of the plurality.

The increasing complexity of mechanical and electrical apparatus requires increased preciseness and versatility in control mechanisms. This is particularly true in the field of electrical switches. Difficulties exist where a plurality of mechanisms require selective actuation of a single one of the mechanisms while the remainder of the plurality are inoperative. In many situations destruction and damage may result if two of the mechanisms are accidentally actuated simultaneously or concurrently. Electrical and electronic safeguards have been developed to guard against such an occurrence. The electrical and electronic mechanisms have not been foolproof, are usually bulky and require considerable maintenance. I have invented apparatus for actuating one of a plurality of mechanisms which positively latches an actuating key in actuating condition with respect to a selected mechanism. The apparatus also precludes concurrent actuation of the other mechanisms while the first is still actuated. The apparatus is mechanical and ideally suited to control of electrical switches. However, the inventive concept is applicable to any mechanism which may be actuated by linear displacement of a portion of the mechanism.

The invention contemplates apparatus for selectively actuating each one of a plurality of mechanisms in nonconcurrent fashion which comprises a case adjacent which the mechanisms are positioned, with a plurality of linearly movable actuating keys within the case, each pressed key being capable of moving to actuate a mechanism and each unpressed key being inoperative to actuate a mechanism. A plurality of latches each adjacent an actuating key is responsive on a ganged basis to any of a plurality of spring loaded dogs each on an actuating key. Each dog moves when the key is pressed so as to position a latch to hold the pressed key in actuating condition. Preferably each actuating key has lock means thereon. A first interlock unit is adapted to engage the lock means of each pair of adjacent actuating keys, while a second interlock unit is adapted to engage the lock means of each nonadjacent actuating key pair. Each of the interlock units may be supported by an interlock plate within the case. The actuating keys may be arranged in a single row or, preferably, may be arranged in double or multiple rows, within the case to conserve space.

The interlock units are positioned by lock means, moved along with a pressed key, so as to preclude unpressed actuating keys from being pressed. Thus the unpressed keys cannot be latched in actuating condition while the first pressed actuating key is actuating a mechanism. Return means for each actuating key operate to return each key from actuating condition when a second key is pressed. The movement of the second pressed key brings the dog of the second pressed key into engagement with one of the tied latches of all the keys so as to unlatch the first pressed key, disengaging it from the first actuated mechanism prior to the actuating of a second mechanism by the second pressed key.

The apparatus of the invention is such that a mechanical time lag exists between initial pressing of an actuating key and effecting actuation of a mechanism by that key. During this lag a previously pressed key is released and deactivates the first actuated mechanism. The interlock units preclude pressing more than one key at a time, since they are moved initially by the lock means on a pressed key into a position interlocking the remainder of the keys in released position.

In a preferred embodiment of the invention the actuating keys are arranged in two rows on either side of a latch plate. A third interlock unit is supported by the latch plate. Each of the actuating keys of both rows has lock means engageable by the third interlock unit. The third unit preferably comprises two interlock strips each engaging a different key row. The two interlock strips are linked by a connecting arm so that movement against one of the strips by an actuating key displaces the two strips oppositely. Thus movement in one row of keys positions the interlock strip of the other row so that none of the keys in that row may be pressed.

In a preferred embodiment of the invention the latches are pivotably supported on a latch plate intermediate two rows of actuating keys. Each actuating key carries a spring loaded dog. A rotary cam intervenes between each spring loaded dog and a pivoted latch. A pressed actuating key moves its attached dog against a pin on the rotary cam rotating the cam and causing the cam periphery to displace the latch to permit a latch pin on the actuating key to be positioned below the latch. Once the dog has rotated the cam sufficiently, the latch springs back into position so that a surface of the latch registers against the latch pin of the key, latching the key in actuating position.

Since all the latches in the preferred embodiment are tied with a tie bar, motion of any of the activating keys serves to release all of the keys from the effect of the latches. A previously pressed key may thus return to unpressed condition. Subsequent activating of a mechanism by a newly pressed key may also take place during the interim in which the total number of latches is made ineffective by the dog induced cam position. The dog of a key and the latch are so related that the latch pin of a pressed key is released from the latch before the interlock units move to permit assumption of activating position by second pressed key. The time interval between unlatching due to a second pressed key and actuation of a second mechanism permits restoration of a first pressed key to nonactuating position. Thus concurrent actuation of two of the plurality of mechanisms is precluded.

The latching of a pressed key in actuating position is mechanically positive. Actuating condition is maintained until a second key is pressed. It is possible in the apparatus of the invention to restore all keys to unpressed condition by pressing a second key sufficiently to release the latches of the apparatus so that a previously pressed key may return to nonactivated position. If the second pressed key is not fully pressed it does not latch in activating position. Thus a whole bank of keys of a particular embodiment may be in inactive position, held there by the return means of each individual activate actuating key.

These and other advantages of the invention are apparent from the following detailed description and drawing in which:

FIG. 4 is a front sectional elevation of the embodiment of FIG. 1 taken along line 4—4 of FIG. 2;

FIG. 6 is a fragmentary sectional elevation showing the embodiment of FIG. 1 in unlatched position;

FIG. 11 is a sectional elevation taken along line 11—11 of FIG. 9;

FIG. 13 is a fragmentary sectional elevation similar to FIG. 11;

FIG. 14 is a fragmentary elevational view of an actuating key;

Figure 1:
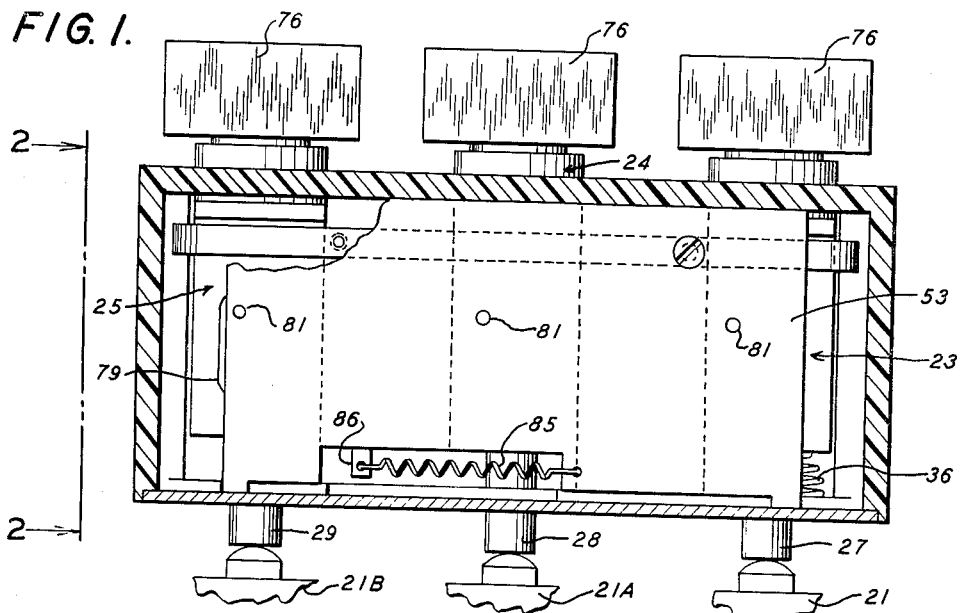
FIG. 1 is a front elevation, with the case broken away, of an embodiment of the invention.
Figure 3:
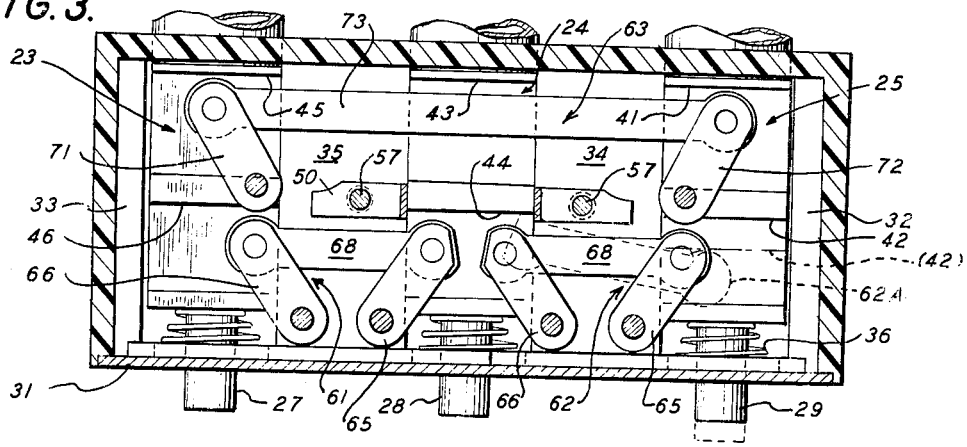
FIG. 3 is a rear sectional elevation of the embodiment of FIG. 1 taken along line 3—3 of FIG. 2.
Figure 2:
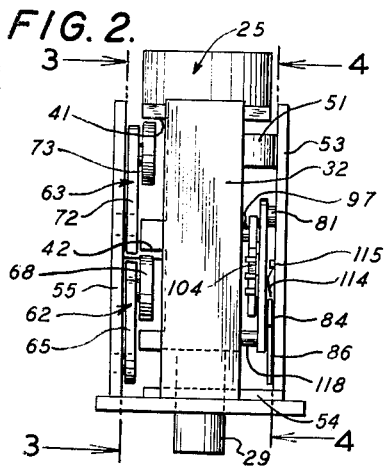
FIG. 2 is an end elevation of the embodiment of FIG. 1 with the outer case removed.

The embodiment of the invention illustrated in FIGS. 1 through 6 is an actuator 20 which may be used to actuate any one of three mechanisms 21, 21A, 21B. An insulating case 22 encloses a plurality of actuating keys 23, 24, 25 having contact rods 27, 28, 29 respectively. A base plate 31 supports a pair of ends guides 32, 33 and a pair of central guides 34, 35. The actuating keys are movable in the spaces between the guides against compression springs 36. The body portion of each actuating key 23, 24 and 25 has a pair of spaced lock shoulders 41, 42, and 43, 44 and 45, 46 respectively. The keys are substantially identical and oriented within the case so that the lock shoulders face the same direction.

A support strap 51 extends from end guide 32 to end guide 33 and a latch plate 53 is fixed to the strap within the case. The latch plate has a foot 54 resting on the base plate. An interlock plate 55 extends vertically at the rear of the guides within the case and is fastened to central guides 34, 35 by conventional screws 57 and bracket 58.

The interlock plate supports a first interlock unit 61, a second interlock unit 62 and a third interlock unit 63. The first and second interlock units are substantially identical, each having spaced arms 65, 66 pivotally mounted to the interlock panel and pivotally joined above the points of pivot by an interlock strip 68. The center to center spacing between the pivots of each strip is greater than the center to center distance between the pivot mountings of the arms 65, 66 to the interlock plate in each case. As can be seen from FIG. 3 each of the first and second interlock units connects between an adjacent pair of actuating keys. The third interlock unit, having pivotal arms 71, 72 and interlock strip 73 connects between nonadjacent or outer pair of actuating keys. Arms 71, 72, are pivotably mounted to the interlock plate and strip 73 is pivotally affixed to the outer ends of the arms. It can be seen that if either end of any of the interlock strips is depressed the opposite end must rise.

The interlock units are so placed that the first and second interlock units are respectively in engageable position with respect to lock shoulders 42, 44 and 44, 46 of the actuating keys. Interlock unit 63 is situated to engage lock shoulders 41, 45 of actuating keys 23, 25 respectively.

Thus when actuating key 23 is depressed by pressure on its identifying button 76, the left hand ends (as viewed in FIG. 3) of both the first and third interlock strips depress in an arc determined by unit arms 66 and 71 respectively. The ends of the first and third interlock strips pivotably connected to interlock arms 65 and 72 raise, contacting actuating key lock shoulders 44 and 41 respectively, precluding actuating keys 24, 25 from being pressed concurrently with key 23.

Referring again to FIG. 3, the dotted lines 62A illustrates interlock unit 62 in the position it assumes when key 25 is pressed. The end of the second interlock strip 68 attached to radial arm 65 moves downwardly about the arm pivot point while arm moves upwardly. The slope of the arms due to the different center to center distances between the arm pivot points and the strip pivot points imposes different vertical motion components on the ends of the interlock strip. The vertical component of motion for each degree of arc traversed is greater for a lowered arm than for a raised arm. Thus, during the linear displacement of a key, the rate of vertical travel of the arms 65, 66 differ in a manner important to effective latching and unlatching of the keys in actuating condition. The importance of this relationship is later explained in conjunction with the description of the latch combination of the embodiment.

FIGS. 4 and 6 illustrate the latch means for holding a depressed actuating key in actuating condition. Each of the actuating keys is urged upwardly by a compression spring 36 previously described. The compression springs reside about contact rods 27, 28, 29 of the actuating keys between the bottoms of the keys and base plate 31. Latch plate foot 54 is apertured so that the springs extend through it to seat against the base plate.

The latch plate 53 pivotably supports a plurality of latches 77, 78, 79, each of which is fastened to the latch plate by a pivot pin 81. Each latch is additionally pivotally secured by a pin 82 to a tiebar 84 spring loaded by a tension spring 85 to move laterally of the latch plate. The spring is attached between the latch plate and a tab 86 extending from the tiebar. The pins 82 may be fixed in the tiebar and slip fitted to the latches.

Each latch 77, 78 and 79 has a cam ramp 88, a latch pin clearance notch 89 and a latch surface 91. The latch surface is at the bottom of the latch as it is oriented in FIG. 4.

Each latch is associated with a particular actuating key, latches 77, 78, 79 being associated with keys 23, 24, 25 respectively. Each of the keys 25, 24, 23 carries a dog 93, 94, 95 respectively, pivotably mounted to a face of the key adjacent the latch plate by a pivot pin 97. A stop pin 98 on each key limits the pivot arc of its dog and also secures one end of a dog spring 99 whose opposite end is secured about the dog to urge it toward the stop pin.

Each dog has a projecting tang 101 projecting toward its associated latch. A rotary cam 102 is rotatably mounted to the latch plate so that it intervenes between latch 77 and dog 95. Similar rotating cams 103, 104 are rotatably mounted to the latch plate and intervene between latch 78 and dog 94, and latch 79 and dog 93, respectively. Each rotary cam is substantially square with rounded peripheral corners. A plurality of contact pins 106, 107, 108, 109 extend outwardly, one from each corner of the cam. The pins extend parallel to the axis of rotation of the cam in the direction of the dogs. Each cam has a shaft 111 pivotably secured in the latch plate.

Figure 5:
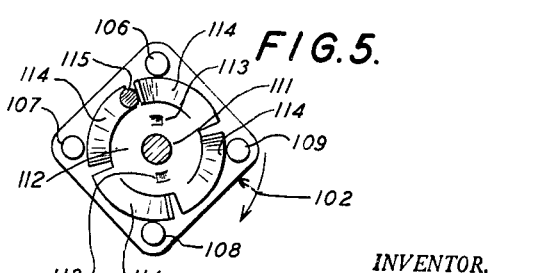
FIG. 5 is a detail view of the reverse side of the rotary cam.

As shown in detail in FIG. 5, a locking disk 112 is fixed to the rotary cam, preferably by means of lugs 113 extending from the disk into the cam. A plurality of arcuate spring ramps 114 on the locking disk 112 gradually rise from the plane of the cam back. A limit pin 115, fixed in the latch plate is adapted to engage the raised end of each spring ramp as the cam turns. The limit pin rides the spring ramp from the surface of the disk until the end of the ramp springs past the pin, precluding backward rotation of the cam.

When each of the actuating keys is in unpressed condition as in FIG. 4, a contact pin 106–109 of the associated rotary cam is engaged by the tab 101 of its dog (93–95). In operation, an actuating key is pressed downwardly as shown in FIG. 6, moving a contact rod such as rod 29 into actuating position against a mechanism. The mechanism may be a mechanical device or a switch such as limit switch. When actuating key 25 is pressed downwardly a latch pin 118 on the key is carried downwardly. There is some degree of freedom created by the notches 89 of each latch so that the latch pin moves freely relative to the latch during first movement of the key. As the key 25 is pressed and moves between the guides, the key dog (in this case dog 93) also moves downwardly, exerting torque pressure against the rotary cam 104 because of engagement between a contact pin and dog tab 101. As the cam rotates, the periphery of a corner of the cam rides against cam surface 88 of the latch and pivots the latch about its pin 81 which is fastened in the latch plate. As the latch pivots about pin 81 it is removed from any possibility of contact with latch pin 118 of key 25 as are latches 77, 78 with respect to similar latch pins 116, 117 of keys 23, 24 respectively.

The positions of the latches and dogs when fully unlatched are shown in FIG. 6. All the latches are moved away from the latch pins of the keys because of the action of the tiebar 84. Any previously latched key is free at this juncture to be returned by its respective compression spring to unpressed position. Key 25 when fully depressed, will be latched in actuating condition by the latch surface 91 of returning latch 79 being moved above the latch pin 118 of the key. The latches and tiebar return to normal position as full downward key travel turns the cam 104. The other keys are not depressed and cannot be depressed because of the condition of the interlock units. The latches 77, 78 associated with keys 23, 24, therefore return, as the cam 104 rotates, to a substantially vertical position in which each key latch pin 116, 117 once again resides within the clearance notch 89 of its latch.

Actuating key 25 is held in actuating position by contact between its latch pin 118 and latch surface 91 of latch 79. This is a positive mechanical lock and only subsequent pressure upon one of the other actuating keys moves the latch so that the pin may be released.

It thus can be seen that a pressed actuating key is positively latched in actuating condition and other actuating keys are precluded from this condition by the interlock units. The rotary cams rotate under the urging of the dogs until the end of a projecting spring ramp 114 of the cam disk passes beyond the associated limit pin 115. Thus the rotary cam is held in position for the next sequence of operation.

Figure 7:
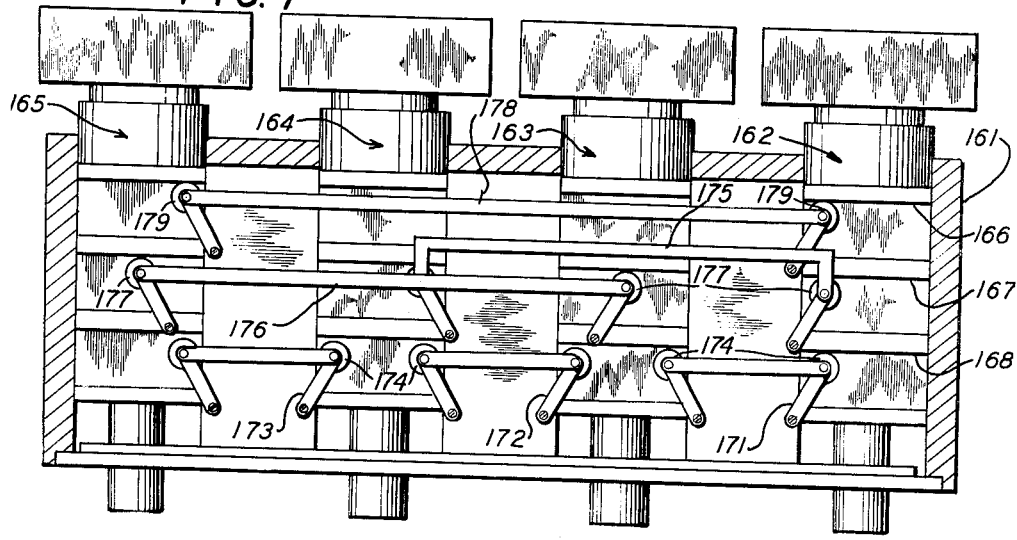
FIG. 7 is a schematic sectional elevation of a further alternate embodiment of the invention having a multiplicity of actuating keys.

FIG. 7 illustrates schematically the arrangement of interlock units for an actuating unit 161 having four actuating keys 162, 163, 164, 165. Each of the actuating keys has three lock shoulders 166, 167, 168 on the same face of the key. The lock shoulders face an interlock plate which is not shown.

The embodiment shown in FIG. 7 has a single row of four keys. If it were desired to double the number of keys by adding a second row, a lock shoulder may be placed on the reverse side of each of the keys and an additional interlock unit provided between the rows of keys. Such a combination is explained in more detail with respect to the embodiment of FIGS. 8 through 16.

Returning now to FIG. 7, it can be seen that there are six sets of interlock units. Three units, 171, 172, 173 connect between adjacent pairs of actuating keys and their roller 174 engage lock shoulders 168 of each of the keys. Interlock units 175 and 176 extend between nonadjacent key pairs 162, 164 and 163, 165 respectively. Interlock units 175, 176 have rollers 177 which engage lock shoulder 167 of the actuating keys.

An interlock unit 178 has contact rollers 179 at its extreme ends which engage lock shoulders 166 of the remote key pair 162, 165. The interlock units act together to preclude pressing more than one key of the actuating unit into actuating condition at the same time.

The concept disclosed by FIG. 7 makes possible units having a large number of actuating keys. The concept may be extended to any number of keys within volume limits set by the bulkiness of a multiplicity of interlock units all engaging lock shoulders on the same side of a key.

The interlock units disclosed in FIG. 7 and in the embodiment of FIG. 1 are advantageous in that they combine in action with smooth latching apparatus, due to the relationship between the pivot points of the arms where they attach to the interlock plate and the pivot points of the interlock strips where rollers attach. The distance between interlock strip pivot points is greater than the distance center to center between the arm pivot points of mounting to the interlock plate. A center to center differential makes for the vertical relationship of the opposite ends of the interlock strip, as previously mentioned. Such differential is conducive to smooth latching and unlatching. The linear travel of a pressed key carries one end of each interlock strip engaged by a lock shoulder through greater net vertical displacement than the tilt of the interlock strip imposes upon the raised end of the strip. The key must travel far enough for the latch to swing back over the latch pin of the key, and then the key is partially returned by the compression spring so that the latch surface and latch pin engage. The partial return travel of the key, although minute, creates some clearance between the raised ends of the interlock strips and the lock shoulders which the strips or the strip contact rollers engage. The clearance makes possible unlatching of the pressed key before the second pressed key is locked against further linear motion by the interlock units. Once the first pressed key is unlatched, it may return to unpressed condition, and disengage from the lowered interlock strip ends so that a new interlock situation may be created.

Figure 8:
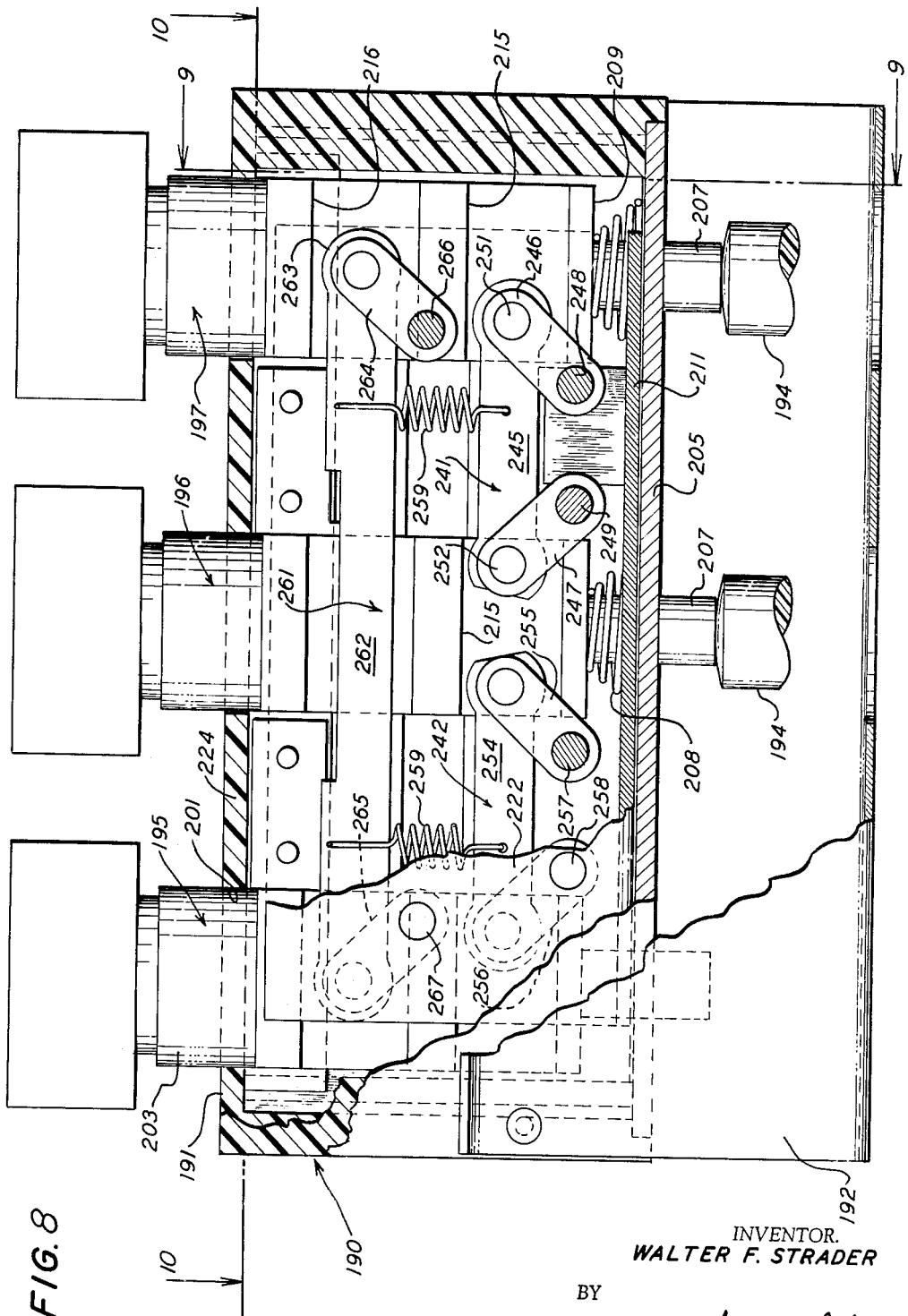
FIG. 8 is front elevation of a still further alternate embodiment of the invention partly broken away to show the interlock units.
Figure 9:
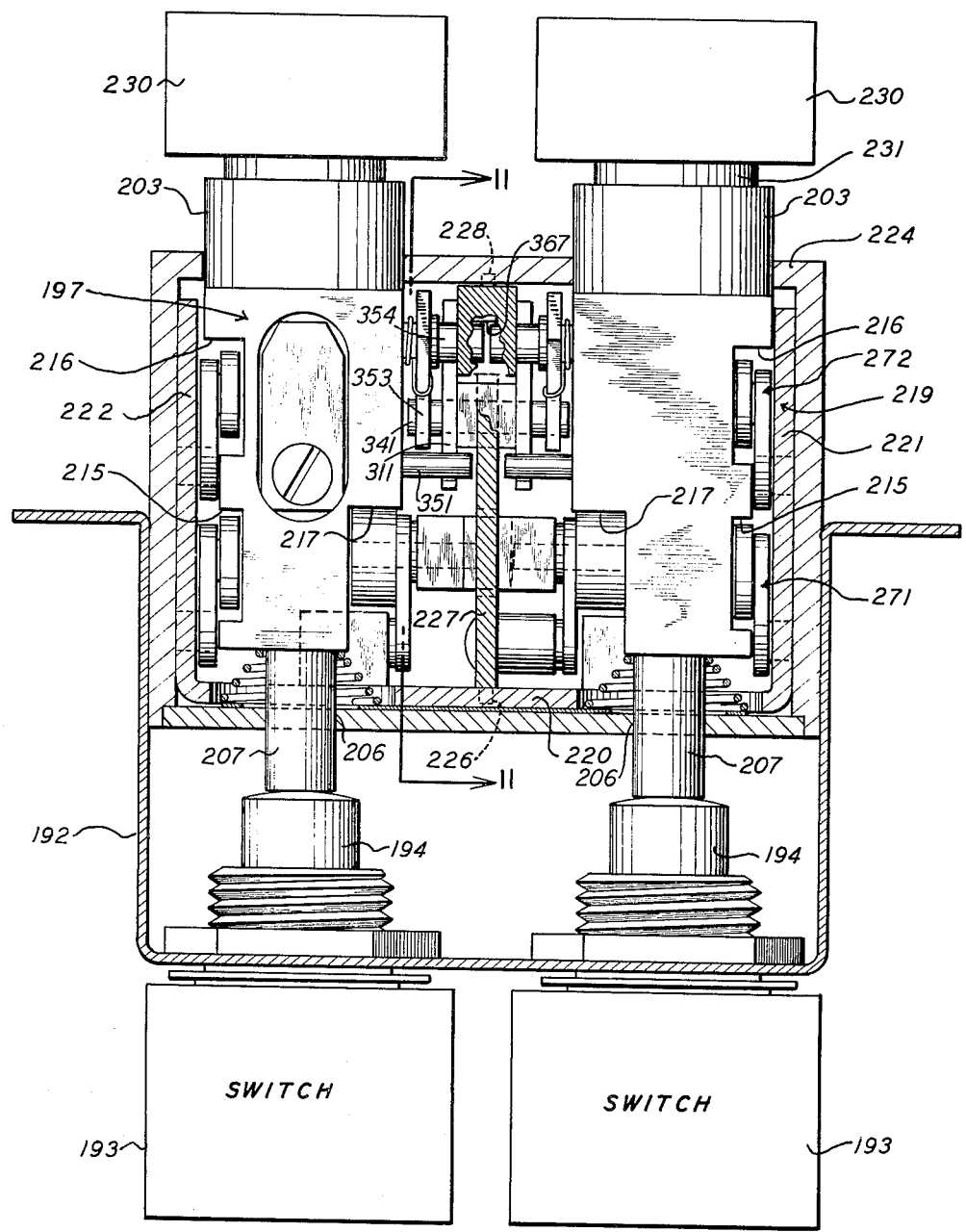
FIG. 9 is a sectional elevation taken along line 9—9 of FIG. 8 and partly broken away.
Figure 12:
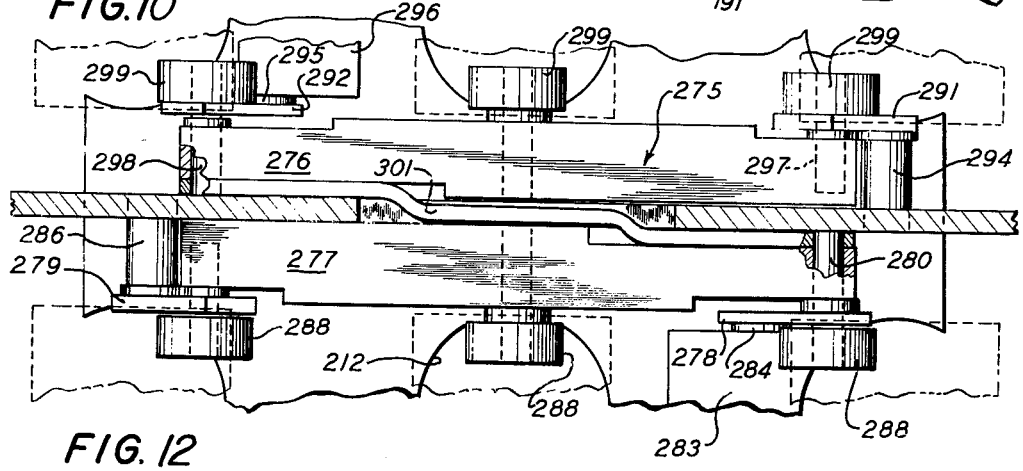
FIG. 12 is a fragmentary plan section taken along line 12—12 of FIG. 11.

The embodiment of FIGS. 8 through 16 utilizes a similar concept for the interlock units which it employs. The figures illustrate an actuating unit 190 having an outer case 191 to which a U-shaped mechanism bracket 192 is attached. The bracket supports a plurality of electrical switches 193 each having a control button 194. The switches and bracket are best seen in FIG. 9. Actuating unit 190 has a plurality of actuating keys 195, 196, 197, 198, 199, 200. Keys 195, 196, 197 comprise one row within the unit and keys 198, 199, 200 comprise a second row within the unit. Case 191, which preferably is of insulating material, has a plurality of holes 201 through which a cylindrical neck 203 of each key exends. The bottom of the case is closed by a lid 205 having holes 206 through which contact rods 207 of each actuating key extend to engage control buttons 194 of the switches. The actuating keys are movable linearly within the case and are guided by sliding contact with aligned case holes 201 and lid holes 206. Each key engages a return spring 208 compressed between a bottom surface 209 of the actuating key and the inner surface of lid 205. A pad 211 rests upon the lid and has, as shown in FIG. 12, a plurality of circular apertures 212. The apertures help to keep the compression springs in proper orientation about the contact rod 207 of each actuating key.

The outer faces of the keys in each row, that is, the faces near the wall of the case each have lower lock shoulders 215 and upper lock shoulders 216. On the inner face of each key is a row lock shoulder 217 (see FIGS. 9 and 14). The row lock shoulder 217 on each of the keys of both rows combines with an interlock unit 275 (FIG. 13) acting to preclude pressing of the key of one row when a key of the other row has been pressed. The manner of this operation will be described later on.

Referring now to FIG. 9, case 191 encloses a U-shaped bracket 219 having a floor portion 220 and upstanding interlock plates 221, 222. The interlock plates are preferably spaced apart the approximate width of the case and extend upwardly to adjacent a top 224 of the case. The center of the bracket floor is perforated to receive tabs 226 of a latch plate 227 extending from the bracket floor to top of the case. Upper tabs 228 extend into perforations in the case top and support the latch plate in vertical orientation.

Figure 10:
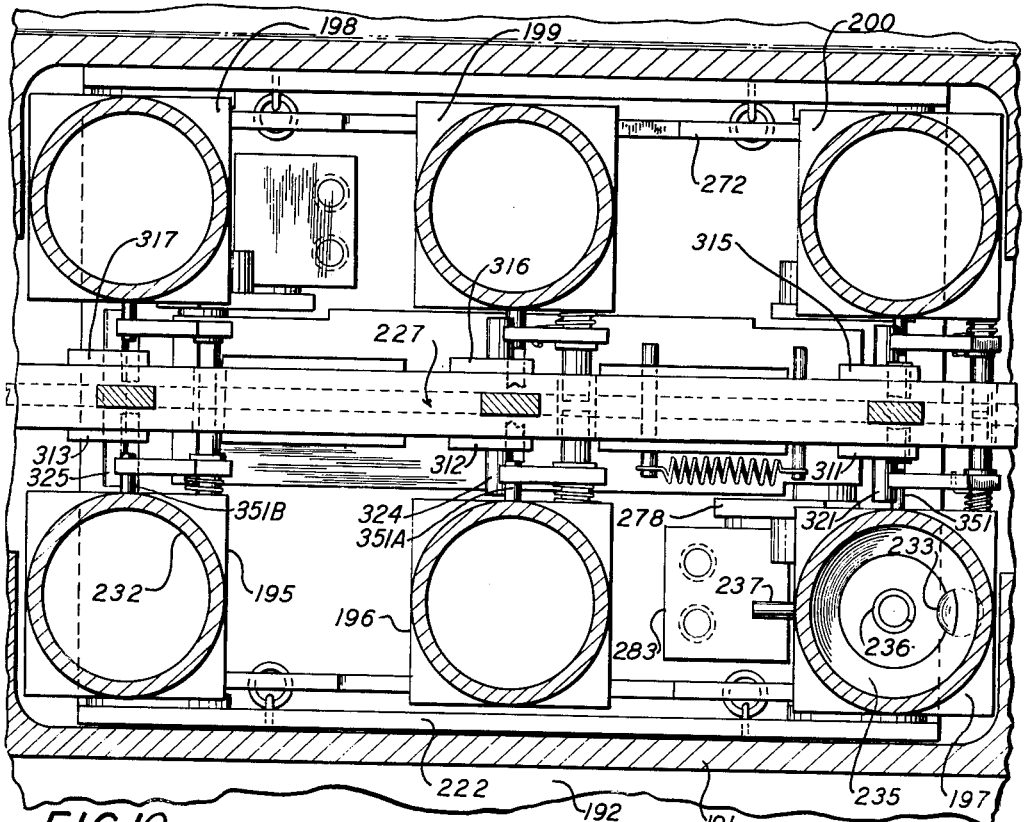
FIG. 10 is a plan section taken along line 10—10 of FIG. 8.

The actuating keys are in rows between the interlock plates and the latch plate. Each key has an identification button 230 having a cylindrical stem 231 fitted into a bore 232 in the top of each key. A loaded detent ball 233 may secure the stem in the bore. The identification buttons may be of a translucent material and a small light bulb (not shown) may be housed within a cavity 235 of an actuating key as shown in FIG. 10. Electrical flow to the bulb may be by means of an insulated small coil spring 236 within the key cavity and electrically connected to a contact pin 237. The contact pin may contact an electrical pole in conventional manner when the key is depressed. The contact pin may thus complete a circuit to light the bulb and illuminate the button of the key that is depressed. This electrical circuitry forms no part of the invention and therefore is not discussed further.

The interlock units supported by each of the interlock plates 221, 222 of the interior bracket of the embodiment of FIGS. 8 through 16 are substantially identical and only those units supported by interlock plate 222 on the left of FIG. 9 and in FIG. 8 will be described. Interlock plate 222 supports three interlock units 241, 242, and 261. Units 241 and 242 are substantially identical and each is adapted to engage adjacent pairs of actuating keys. Interlock unit 241 has an interlock strip 245 pivotably supported by pivotal arms 246, 247 which are pivotably mounted by pins 248, 249 to the interlock plate. Pivot pins 248, 249 have a lesser center to center distance than do pivot pins 251, 252 which connect the pivotal arms to the interlock strip, for reasons previously set forth. Each end of the interlock strip is rounded for smoother action against lock shoulders 215 of the keys. Interlock unit 242 is similarly comprised, having an interlock strip 254 pivotally supported from pivotal arms 255, 256, in turn supported from the interlock plate by pins 257, 258.

Each of interlock units 241, 242 may be urged upwardly as viewed in FIG. 8 by tension springs 259 fastened at one end to the interlock strip and at the other end through the wall of the interlock plate, although such springs are not essential to smooth operation of the units.

Third interlock unit 261 has an interlock strip 262 having rounded ends 263 pivotably supported by pivotal arms 264, 265 secured by pivot pins 266, 267 to interlock plate 222. The between center distance of pins 266 and 267 is less than the distance between the pins securing the arms to the interlock strip. The third interlock unit is adapted to engage upper lock shoulders 216 of the outside actuating keys adjacent interlock plate 222.

As explained with respect to previous embodiments, when a key such as actuating key 197 is pressed, the lock shoulders 216 and 215 depress the adjacent ends of interlock units 261 and 241, causing the opposite ends of each of these units to rise. When the pressed actuating key is latched in actuating position in the manner later to be described, the interlock units remain in tilted position, thereby inhibiting downward movement of keys 196 and 195 because of the engagement between the interlock units and the lock shoulders of those two actuating keys.

When the latch conditions are such that return spring 208 of the pressed key urges the key upwardly, the previously depressed ends of the interlock unit strips are carried upwardly, restoring the condition illustrated in FIG. 8.

The interlock combination just described is applicable, as previously stated, to the interlock units pivotably supported from interlock plate 221, such as the unit 271 and 272 visible in FIG. 9. The three interlock units supported by interlock plate 221 perform the same function with respect to actuating keys 198, 199 and 200 as do the units 241, 242 and 261 for actuating keys 195, 196, 197.

In order that no key of the second row be pressed when a key of the first row is already pressed a fourth interlock unit 275 is mounted adjacent latch plate 227. This fourth interlock unit comprises a pair of spaced interlock strips 276, 277 each on an opposite side of the latch plate. As can be seen from FIG. 13 interlock strip 277 is supported by a pair of pivotal arms 278, 279, attached thereto by fastening pins 280, 281 respectively. The other end of arm 278 is pivotably mounted to a mounting block 283 fixed to the floor of the inner bracket. Mounting is accomplished by a pivot pin 284 extending from the arm into the block.

Arm 279 is pivotably mounted to latch plate 227 by a pivot pin 286 about which the arm pivots. Thus, as can be seen from FIGS. 11 and 13, interlock strip 277 is capable of downward displacement while maintaining a parallel orientation with respect to the base of the inner bracket. The respective center to center distances of upper pins 280, 281 and lower pins 284, 286 are equal so that interlock strip 277 moves so that each position assumed is parallel to any other position during the travel of the strip. Strip 277 carries a plurality of contact rollers 288 positioned to contact previously described row lock shoulders 217 on each of keys 195, 196, 197.

Interlock strip 276 on the opposite side of the latch plate is similarly comprised. Pivotal arms 291, 292 are supported respectively by pins 294, 295. Pin 294 is rotatably mounted in the latch plate 227 while pin 295 is rotatably mounted in a support block 296 fixed to floor of inner bracket 219. The interlock strip 276 is pivotably supported on the pivotal arms at its opposite ends by a pair of pins 297, 298. Interlock strip 276 carries a plurality of contact rollers 299 each adapted to make contact with a row lock shoulder 217 of one of actuating keys 198, 199, 200.

A connecting link 301 is articulately connected to interlock strip 276 by pin 298, and to interlock strip 277 by pin 280. These pins are at opposite ends of the interlock strips so that the connecting link in effect ties together the opposite ends of each of the strips. An opening 303 in the latch plate 227 provides passage for the link 301 from one face to the other of the latch plate. Each interlock strip 275, 277 is cut out to receive the link.

Referring now to FIG. 11 it can be seen that the two interlock strips and the link have substantially coincidental upper surfaces when all actuating keys are in normal or unpressed condition. In FIG. 13 the positions of the three elements of interlock unit 275 are shown. When a key such as key 197 is pressed, row lock shoulder 217 of key 197 decends. It engages the associated roller 288 and depresses the end of interlock strip 277 supported by pivotal arm 278, exerting a pull on connecting link 301. Since the opposite end of the link is pinned to interlock strip 276, that strip must displace to the right as shown in FIG. 13. Because of the slope of the pivotal arms supporting strip 276 with respect to key movement, such displacement results in upward motion of the strip. Upward motion, as is obvious in FIG. 9, brings the contact rollers 299 of the strip into engagement with lock shoulders 217 of the keys in the row opposite key 197. The resulting engagement precludes pressing any of the keys of that row while key 197 is in actuating position.

The combination of interlock units described thus effectively precludes concurrent actuation of the keys of either row when a key of either row is pressed. Release of the interlock units to the normal position as shown by FIGS. 8 and 11 occurs when the latch system to be described effects release of the key previously pressed.

The latch system of the embodiment of FIGS. 8 through 16 comprises a plurality of latches 311, 312, 313, each associated respectively with keys 197, 196, 195, and a plurality of latches 315, 316, 317, each associated with a key 200, 199, 198 respectively. Latch 311 pivots about a pin 321 extending into a truss 322 of the latch plate. Similarly, latches 312 and 313 have pivot pins 324, 325 respectively. Each of the pivot pins 321, 324, 325 for the latches extends through the truss and outwardly from the side opposite the latches 311, 312, 313 to pivotably mount the latches 315, 316, 317. Preferably the pins are fixed in the truss and the latches are free to pivot on them.

The heavy truss 322 is at the top of the latch plate. Immediately beneath the truss is a horizontally elongated slot 327 in which a tie bar 328 resides so as to have some degree of freedom. The tie bar is spring loaded by a tension spring 331 to move in horizontal fashion within the slot. Opposite ends of the tension spring are connected by pins to the truss of the latch plate and to the tie bar. A plurality of retainers 333 are fixed to the truss 322 and each has an overlap tab 334 depending along the vertical sides of the tie bar so that the bar cannot be displaced from the slot.

The latches associated with each of the two rows of actuating keys are positioned exactly opposite each other on opposite faces of the latch plate. In addition to sharing a common pivot pin, each pair of latches has a thrust pin 341 extending therethrough and through the tie bar 328. Each thrust pin extends beyond the surfaces of the respective latch pairs. Each pin 341 may be fixed in the tie bar and the latches may be free to turn thereon. The tie bar gangs the latches so that when one latch is displaced about its pivot all of the latches are similarly displaced due to the axial motion of the tie bar.

Each latch has a latch surface 345 located on a portion of the latch remote from the pivot pin. The latches are all substantially flat pieces so that latch surface 345 is relatively narrow. The latch surface extends substantially perpendicular to the path of the motion of the actuating keys. A notch 347 opens from a side of each latch to receive a latch pin fixed to an actuating key and extending across the latch plate from the key body. For instance key 197 has a latch pin 351 extending therefrom toward latch plate 227. The notches 347 open on the side of each latch adjacent a key dog 353 on each key. Each key dog is pivotally mounted on a dog pin 354 preferably fixed in the key near an edge thereof. As can be seen from FIG 9, the key dogs are spaced outwardly from the faces of the keys so that each may engage extending thrust pin 341 of the latch with which it is associated.

The dog pin 354 also supports a dog spring 355. Spring 355 has an end 356 wrapped about a side of the key dog, and a second end 357 engaged with a stop pin 359 in the body of the key. Each of the keys such as the exemplary key 360 shown in FIG. 14 is similarly provided with a latch pin, a key dog, a dog spring and dog pin, and a stop pin such as just described in conjunction with key 197. The orientation of the pins and the dog with respect to the thrust pin 341, shown in dotted lines in FIG. 14, is important since each dog has a cam ramp 363 adapted to engage a thrust pin of the latch with which the dog and key are associated. The position of the dog with respect to the thrust pin must be carefully maintained. Therefore dog pin 354 extends from its key across the space intervening between the latch plate and the key into a vertically elongated slot 367 in the truss section 322 of the latch plate to ride therein and prevent twist of the key with respect to the latch plate. Similarly, dog pins 354A, 354B of keys 196 and 195 extend into slots 368, 369 shown in dotted lines in the FIG. 11. Similar dog pins on the keys 198, 199, 200 extend into the slots 369, 368, and 367, respectively, from the opposite side of the latch plate. Thus each of the six actuating keys of the embodiment of FIGS. 8 through 16 is prevented from twisting with respect to the latch plate by the dog pins maintaining the relationship necessary to effective engagement between the key dogs and the thrust pins of the individual latches.

Each dog of each key has a downwardly extending tab 371 which in the normal position of the dog extends along the thrust pin of the latch with which the dog is associated. The tab serves a function when a key is pressed, helping to reorient the dog with respect to the thrust pin on the return of the key to unpressed condition.

Figure 15:
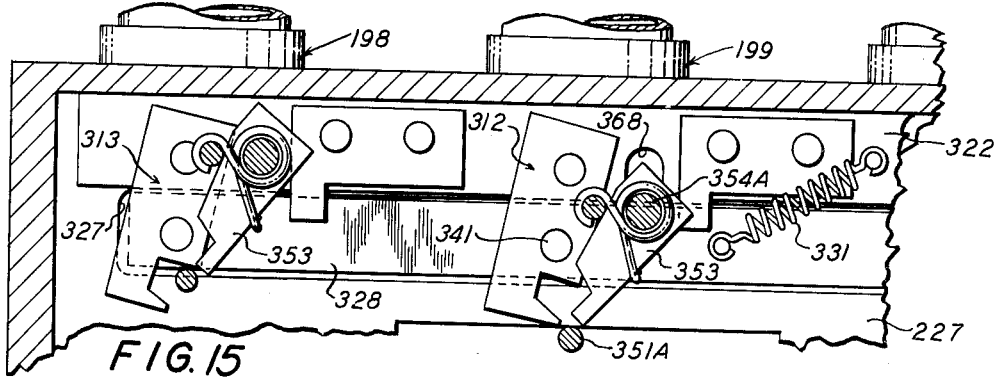
FIG. 15 is a fragmentary sectional elevation similar to FIG. 11 showing the condition of the dogs and latches when a key is pressed.

As can be seen from FIGS. 11 and 14, the position of cam surface 363 of each dog, when the actuating key is in normal position, is against the periphery of the thrust pin of the latch. The orientation of the cam surface is oblique to the line of movement of the key. Thus, when the key is pressed, the downward motion of the dog, held spring-loaded against the thrust pin by spring 355, results in a generally horizontal movement of the thrust pin 341 as viewed in FIG. 11. This thrust pin movement causes clockwise rotation of the latch thus imposed upon, and because of the tie bar, all of the latches of the actuating mechanism 190. When a latch has been displaced sufficiently so that notch 347 of the latch no longer encloses latch pin 351, the cam surface 363 of the dog no longer engages the thrust pin. Rotation of the dog toward the thrust pin is stopped by pin 359 so that on further downward motion of the key, the dog releases the thrust pin and latch. This downward motion of the key carries the latch pin 351 below latch surface 345 of the latch. Once the pin clears the latch, tension spring 331 of the tie bar restores the latches to the latching position shown in FIG. 16. During the interval that a key is being pressed downwardly the latches and dogs assume the positions shown in FIG. 15, in which latch 312 associated with key 196 has been pivoted clockwise as shown in FIG. 15, along with latch 313 associated with actuating key 195. However note that the key dog of unpressed key 196 has not moved downwardly, nor has the latch pin of that key. As shown in FIG. 15, latch 312 is just clearing latch pin 351A and the latches are about to return to the position of FIG. 16 under the bias of spring 331.

Of course, during the downward travel of the actuating key the previously described interaction of the interlock units is taking place. It is therefore obvious that downward motion of an actuating key effects not only the unlatching of the total number of keys in the actuating mechanism, but also the interlocking of all of the actuating keys so that only one may be pressed at the same time.

Figure 16:
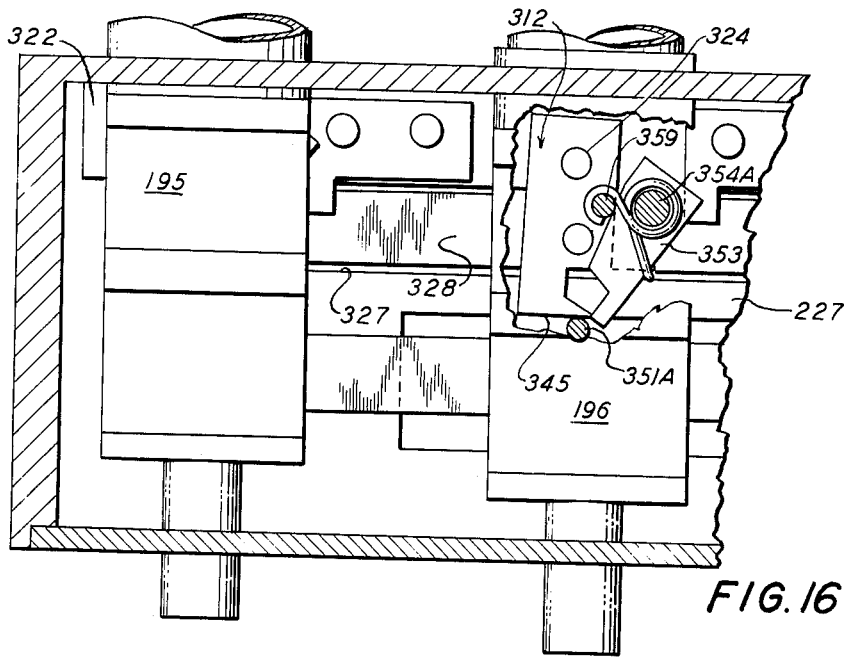
FIG. 16 is a fragmentary sectional elevation similar to FIG. 11 showing an actuating key in actuating position.

As shown in FIG. 16, the latch surface 345 of the latch 312 is disposed above latch pin 351A of the actuating key 196. The alignment of latch pivot and latch pin together with the spring tension on the tie bar is sufficient to maintain the latch against upward thrust of the latch pin under the load imposed by key return spring 208. With the latch pin 351A engaged by the latch surface 245 of the key, the actuating key 196 is held in actuating condition so long as a second key is not pressed to rotate and unlatch the latches of all the keys, including the one first pressed, into the free position shown in FIG. 15.

The interlock units are so arranged that the pressing of a second key first releases the latches for all the keys, thus inducing the return of a first pressed key to non-actuating position. Sequentially then, the second pressed key shifts the interlock units into the new condition and reaches actuating position itself. Thereafter the latches swing into latching position engaging the latch pin and the latch surface associated with the second pressed key. Thus the second pressed key now achieves a mechanism actuating condition in which it is latched in switch actuating position and all other keys are precluded from assuming such a position without release first of the second pressed key.

It is clear from the illustrative embodiments that the inventive concept is versatile in its scope. The uses to which the mechanism can be put are as varied as the number of mechanisms that can be activated by linear thrust. The number of actuating keys may vary in a large range. Therefore the scope of invention is not limited to specific embodiments disclosed for illustrative purposes, but rather by the appended claims.

I claim:

1. In apparatus having a plurality of linearly movable actuating keys arranged in rows within a case, the combination comprising lock shoulder means on each key, an interlock strip adapted at each of its ends to engage a lock shoulder means of an actuating key, a first rotatable arm pivotably attached at one of its ends to one end of the interlock strip and at its other end to a pivot support, and a second rotatable arm pivotably attached at one of its ends to the other end of the interlock strip and at its other end to a pivot support, the spacing between the pivot supports with respect to the spacing of the points of attachment to the interlock strip being so related that the displacement of one end of an interlock strip due to a pressed actuating key in the direction of key movement is greater than is the opposite displacement of the other end of the interlock strip imposed by the arm linkage of the strip.

2. The combination defined in claim 1 in which said other end of the interlock strip prevents actuating movement of the actuating key whose lock shoulder means it engages while the pressed actuating key is in actuated position, means for locking the pressed key in actuated position, and means operable to return the first pressed key from actuated position when a second actuating key is pressed.

3. The combination defined in claim 1 including a pivotally supported latch associated with each key to latch a pressed key in actuated position, means interconnecting said latches for common movement, and means for moving all of said latches to unlatching position upon initial pressed movement of any actuating key.

4. The combination defined in claim 1 including a dog pivotally mounted on each key, means biasing each dog for rotation relative to its key, a latch associated with each key and pivotally mounted on a fixed part to latch its associated key in acuated position, a tie bar linking said latches, means rotatably mounted between the dog and latch of each key for moving all the latches to unlatching position upon initial pressed movement of any actuating key, and means for returning an actuated key to its non-actuated position upon release thereof by its latch.

References Cited by the Examiner

UNITED STATES PATENTS

| | | | |
|---|---|---|---|
| 224,653 | 2/80 | Coy | 200—50.3 X |
| 758,722 | 5/04 | Van Horn | 74—483 |
| 799,019 | 9/05 | Setter. | |
| 955,134 | 4/10 | Cadell. | |
| 1,031,139 | 7/12 | McKensie. | |
| 1,232,793 | 7/17 | Grimes. | |
| 1,809,778 | 6/31 | Evans | 74—483 |
| 1,810,399 | 6/31 | Horni | 74—483 |
| 2,108,634 | 2/38 | Wilms | 200—50.3 |
| 2,215,110 | 9/40 | Shoup | 235—55 |
| 2,318,554 | 5/43 | Raney | 74—483 |
| 2,344,091 | 3/44 | Kirk. | |
| 2,451,090 | 10/48 | Johnson | 235—27 |
| 2,502,042 | 3/50 | Hasselbaum | 200—5 |
| 2,973,663 | 3/61 | Williams | 74—483 |

FOREIGN PATENTS

| | | |
|---|---|---|
| 484,100 | 10/29 | Germany. |
| 800,184 | 8/58 | Great Britain. |
| 354,393 | 11/37 | Italy. |
| 40,538 | 6/07 | Switzerland. |

BROUGHTON G. DURHAM, *Primary Examiner.*